United States Patent Office 3,467,608
Patented Sept. 16, 1969

3,467,608
CATIONIC STARCH COMPOSITIONS AND A
METHOD OF PREPARATION
Henry J. Dishburger and William P. Coker, Lake Jackson, Tex., assignors to The Dow Chemical Company, Midland, Mich., a corporation of Delaware
No Drawing. Filed June 27, 1966, Ser. No. 560,828
Int. Cl. C08b 19/04; D21h 3/28, 3/48
U.S. Cl. 260—9                                      8 Claims

ABSTRACT OF THE DISCLOSURE

Novel cationic starch compositions are prepared in the novel process comprising reacting a starch with a polyalkylenimine or polyalkylenepolyamine having a molecular weight of at least about 50,000. The cationic starches are useful as flocculants.

BACKGROUND OF THE INVENTION

The present invention relates to novel cationic starch compositions and to a process for preparing them. More particularly, it relates to a starch which has been modified by combination with a polyalkylenimine (hereafter PAI) or a polyalkylenepolyamine (hereinafter PAPA). The novel compositions of the present invention have a demonstrated utility as flocculating agents.

The reaction of starch with ethylenimine monomers to produce an aminoethylated starch is well known. Such compositions are discussed, for example, by R. W. Kerr and H. Neukom, Die Starke, 4, 255 (1952). Such aminoethylated starch compositions were reported by Kerr and Neukom to be stable when washed with an aqueous methanol solution acidified with hydrochloric acid. Kerr and Neukom also attempted to combine polyethylenimine (hereinafter PEI) having a molecular weight of about 850 with starch. When such products were washed with the same aqueous methanol solution acidified with hydrochloric acid, it was found that PEI was removed from the starch.

SUMMARY OF THE INVENTION

It has now been discovered that stable PAI or PAPA-starch compositions may be prepared by reacting a starch with a PAI or PAPA having a molecular weight of at least about 50,000. The resulting cationic starch contains, in combined form, total solids basis, from about 0.5 to about 20 percent by weight PAI or PAPA having a molecular weight of at least about 50,000 and from about 80 percent to about 99.5 percent by weight of starch. Due to the difficulty of combining all of the PAI or PAPA with the starch as the ratio of PAI or PAPA to starch is increased, the cationic starch preferably contains from about 0.5 to about 10 percent by weight PAI or PAPA and from about 90 to about 99.5 percent by weight starch. In contrast to the PEI-starch product obtained by Kerr and Neukom, the PAI or PAPA-starch compositions of the present invention do not decrease in nitrogen content when subjected to washing with aqueous methanol acidified with hydrochloric acid as in Kerr and Neukom.

While the precise nature of the combination involved in the present invention is not fully understood and the invention is not intended to be bound to any particular theory, it is believed that the starches of the present invention have the PAI or PAPA tied up by a combination of impregnation and ionic bonding. It is believed that removal of a low molecular weight PAI or PAPA from starch by water occurs through solvolysis when the low molecular weight PAI or PAPA-starch adduct is dissolved in water. Cationic starch formed from higher molecular weight PAI or PAPA is also soluble in water, but the PAI or PAPA cannot be removed from the starch by solvolysis.

In general, any PAI or PAPA having a molecular weight of at least about 50,000 is operable to produce the compositions of the present invention. The upper limit of the molecular weight for the PAI or PAPA used is limited only by the solubility of the PAI in water. Thus, PAI or PAPA having a molecular weight of 1,000,000 and higher may be used in the present invention.

The polymerization of alkylenimines has been reviewed in Jones, "The Polymerization of Olefin Imines," in P. H. Plesch, ed., The Chemistry of Cationic Polymerization, New York, Macmillan (1963), pages 521–534. Suitable PAI's for the purpose of this invention are disclosed by Jones and include the polymers of ethylenimine, 2-methylethylenimine, 2-ethylethylenimine, cis-2,3-dimethylethylenimine, trans-2,3-dimethylethylenimine, 2,2-dimethylethylenimine, and the like.

In addition, polyalkylenepolyamines having a molecular weight above 50,000 are operable. Such PAPA's may be prepared, for example, by further polymerizing an alkylenepolyamine such as ethylenediamine, diethylenetriamine, triethylenetetramine, tetraethylenepentamine, pentaethylenehexamine, and the like, with a difunctional organic compound such as a dihaloalkane (e.g., 1,2-dichloroethane), and the like. Such PAPA's have the same empirical formula as the corresponding PAI's.

Any of the known starches and starch derivatives, such as those described in Brautlecht, Starch—Its Sources, Production and Uses, New York, Reinhold, may be used in the practice of the present invention. Suitable specific examples include potato starch, corn starch, arrowroot starch, sweet potato starch, wheat starch, rice starch, tapioca starch, sago starch, and like substances having the starch molecular structure. It is often preferable to use a modified starch obtained by hydrolysis, oxidation, esterification, or etherification of a natural starch. The term "starch" or "starches" is used herein to encompass both natural and such modified starches.

The novel cationic starches of the present invention are prepared by combining PAI or PAPA having a molecular weight of at least about 50,000 with a starch in the proportions of from about 0.5 to about 40 percent by weight, total solids basis, of the PAI or PAPA and from about 60 to about 99 percent by weight of the starch and heating the resulting mixture within the range of about 70° C. to about 110° C. for a time of from about 0.5 to about 5 hours. The preferred range is from about 0.5 to about 10 percent by weight of the PAI or PAPA and from about 90 to about 99.5 percent by weight starch. This is due to the difficulty of combining all of the PAI or PAPA as the latter is increased. In practice, the PAI or PAPA and starch mixture is refluxed in an aqueous solution.

The resulting cationic starch may be separated from its aqueous suspension by precipitation with, for example, a 2:1, weight basis, mixture of methyl alcohol and diethyl ether. The product may be purified by washing the product with, for example, a 60 percent by weight solution of methanol in water acidified with hydrochloric acid, filtering, repeating as necessary, and finally washing with methanol only. The resulting product is a white powder having a nitrogen content of from about 0.3 percent by weight to about 26 percent by weight, depending on the amount of PAI or PAPA used, and contains, in combined form, from about 0.5 to about 20 percent by weight, total solids basis, of PAI or PAPA and from about 80 to about 99.5 percent by weight, same basis, of starch.

The cationic starch of the present invention is useful as a flocculating agent. It should also find use in applications where aminoethylated starch is useful, for example, as textile sizes.

SPECIFIC EMBODIMENTS

The following examples describe completely representative specific embodiments and the best modes contemplated by the inventors for practicing the claimed invention. The invention is limited only by the scope of the claims appended hereto.

Example 1

Into a reaction vessel equipped with means for stirring, refluxing, and temperature control is placed 50 g. of a 33 percent by weight solution in water of PEI having an average molecular weight of about 200,000, prepared by polymerizing ethylenimine with an ethylene dichloride catalyst in aqueous solution, and 400 g. of water. To this dilute aqueous solution is added 25 g. of potato starch. The resulting suspension is heated with stirring at 90° C. for two hours. The mixture is cooled and poured into a 2:1, weight basis, methyl alcohol-diethyl ether mixture in order to precipitate the PEI-modified starch. The product is filtered, washed with methanol, dried at 25° C. overnight, and then at 75° C. for 1 hour. The resulting white powder has a nitrogen content of 5.47 weight percent.

This product is then purified by suspending the powder in a 60 percent by weight water solution of methanol acidified with hydrochloric acid, filtering, washing again with an acidified methanol solution, and finally washing with methanol only. After drying, the purified product has a nitrogen analysis of 5.58 weight percent. This analysis shows that about 42 percent by weight of the PEI used reacted with the starch. Since there was no loss in nitrogen content during the wash procedure, it may be concluded that the PEI is bound to the starch.

Example 2

Into a reaction vessel equipped as in Example 1 is placed 24.77 g. of potato starch and 475 g. of water. The resulting suspension is heated with stirring for 1 hour at 87° C. and 0.23 g. of PEI having an average molecular weight of about 200,000 is added as a 33 percent by weight solution in water. The solution temperature is maintained at 87° C. for one hour, an additional 475 g. of water is added, and the modified starch is cooled to room temperature. The modified starch product remains dispersed in the cold water and forms a clear solution which is slightly more viscous than a cooked paste prepared with the same amount of starch and no PEI. Based on the amount of PEI employed, the product has a nitrogen content of 0.3 weight percent For use as a flocculation agent, this product may be diluted with water without isolation and purification of the modified starch.

Example 3

A modified starch is prepared according to the procedure of Example 2 with 24.77 g. of corn starch. The resulting product has a nitrogen content of 0.3 weight percent.

Substitution of other PAI's and PAPA's defined above for the PEI and substitution of other starches as defined above for the potato starch and the corn starch gives a similar modified starch composition.

Example 4

Modified starch compositions prepared as above are evaluated as flocculating agents by measuring their flocculating activity on taconite tailings slurry of the magnetite type. The slurry is diluted to a 5.3 weight percent solution in water. Equal portions of this slurry are placed in 100 ml. graduated cylinders and mixed with the cationic starch. The flocculating agents are added in the form of aqueous 0.05 percent by weight solutions with thorough mixing accomplished by repeated inversions of the settling vessels. An equal untreated portion of the slurry is agitated similarly for comparison. All of the cylinders are brought to an upright position to initiate sedimentation. The effect of the flocculating agents on settling rates is measured by recording the time required for the solid-liquid interface to settle three inches in the cylinder.

The effect of the flocculating agents upon the concentration of suspended solids is measured by determining the turbidity of the supernatant liquid with a Klett-Summerson colorimeter, 400–465 millimicron filter, after two minutes' settling time. The slurry and flocculating agent to be evaluated are mixed together as for the settling rate determination and a portion of the treated slurry transferred into the colorimeter cell and settling time initiated. The clarity is reported as optical density measurements based on distilled water being equal to 0. The results of the settling rate evaluation and the clarity evaluation are summarized in the following table for the flocculating agents evaluated.

| Flocculating Agent | Amt. of flocculating agent used, p.p.m. | Clarity, optical density | Settling rate, in./min. |
|---|---|---|---|
| (1) Blank (no flocculating agent) | | (¹) | (¹) |
| (2) PEI (mol. wt. 200,000), potato starch, 0.3% N | 20 | 29 | 17.7 |
| (3) Polyalkylenepolyamine ² (mol. wt. 200,000), corn starch, 0.3% N | 20 | 55 | 15.0 |
| (4) PEI (mol. wt. 200,000), corn starch, 0.3% N | 20 | 315 | 12.0 |
| (5) Polyalkylenepolyamine ² (mol. wt. 200,000), corn starch, 0.3% N | 100 | 215 | 8.6 |

¹ Off scale.
² Prepared by condensing triethylenetetramine with 1,2-dichloroethane to give a product having the indicated molecular weight and the same empirical formula as PEI.

These results show that the cationic starches of the present invention function well as flocculating agents. In the case of the PEI-potato starch adduct, superior flocculating values are obtained compared with results obtained from an equivalent amount of aminoethylated starch prepared from ethylenimine and potato starch.

We claim:
1. A process for preparing a cationic starch which comprises heating within the range of from about 70° C. to about 110° C. for a time of from about 0.5 to about 5 hours, a mixture which comprises, total solids basis, from about 0.5 to about 40 percent by weight of a polyalkylenimine or polyalkylenepolyamine having molecular weight of at least about 50,000 and from about 60 percent to about 99.5 percent by weight starch.

2. A process as in claim 1 wherein the polyalkylenimine or polyalkylenepolyamine is polyethylenimine or polyethylenepolyamine.

3. A process as in claim 1 wherein the starch is potato starch or corn starch.

4. A process as in claim 1 wherein the polyalkylenimine or polyalkylenepolyamine is polyethylenimine or polyethylenepolyamine, the starch is potato starch or corn starch, and from about 0.5 to about 10 percent by weight polyalkylenimine or polyalkylenepolyamine is combined with about 90 to about 99.5 weight percent starch.

5. A cationic starch prepared by the process of claim 1.

6. The cationic starch defined in claim 5 wherein the polyalkylenimine is polyethylenimine and the polyalkylenepolyamine is polyethylenepolyamine.

7. The cationic starch defined in claim 5 wherein the starch is potato starch or corn starch.

8. The cationic starch defined in claim 5 wherein the polyalkylenimine is polyethylenimine, the polyalkylenepolyamine is polyethylenepolyamine, the starch is potato starch or corn starch, and from about 0.5 to about 10 percent by weight of polyalkyleneimine or polyalkylenepolyamine is combined with about 90 to about 99.5 percent by weight starch.

References Cited

UNITED STATES PATENTS

| | | | |
|---|---|---|---|
| 3,320,118 | 5/1967 | Black et al. | 162—175 |
| 3,331,833 | 7/1967 | Jarowenko | 260—233.3 |

OTHER REFERENCES

Kerr and Neukom: "The Reaction of Starch With Ethylenimine," Die Starke, 4, 255 (1952).

WILLIAM H. SHORT, Primary Examiner

E. M. WOODBERRY, Assistant Examiner

U.S. Cl. X.R.

162—168, 175